United States Patent [19]

Harrison

[11] Patent Number: 4,560,705

[45] Date of Patent: Dec. 24, 1985

[54] IMPREGNATING POLYSTYRENE BEADS WITH AN EXPANDING AGENT

[75] Inventor: James M. Harrison, Fort Worth, Tex.

[73] Assignee: Texstyrene Plastics, Inc., Fort Worth, Tex.

[21] Appl. No.: 729,895

[22] Filed: May 2, 1985

Related U.S. Application Data

[63] Continuation of Ser. No. 603,887, Apr. 23, 1984.

[51] Int. Cl.$^4$ .............................................. C08J 9/18
[52] U.S. Cl. ........................................ 521/60; 521/56; 521/146
[58] Field of Search .................................. 521/56, 60

[56] References Cited

U.S. PATENT DOCUMENTS 2,911,381 11/1959 Roth ...................................... 521/60
3,051,682 8/1962 Ott ......................................... 525/252
3,827,990 8/1974 Wright .................................. 521/60
4,226,942 10/1980 Wei ........................................ 521/60
4,312,957 1/1982 Spicuzza .............................. 521/60

Primary Examiner—Morton Foelak
Attorney, Agent, or Firm—Kinzer, Plyer, Dorn & McEachran

[57] ABSTRACT

A method of impregnating polystyrene beads with an aliphatic hydrocarbon, rendering it into expandable polystyrene. The method involves the use of an improved impregnating solution or bath. The solution includes water, an expanding agent, the polystyrene beads and soaps which act as anti-agglomeration agents. The beads are maintained in the solution for a selected time period and at a temperature and pressure suitable to permit the expanding agent to impregnate the beads. The beads are then separated from the solution and, after drying, they are ready for use, no further processing being required.

5 Claims, 1 Drawing Figure

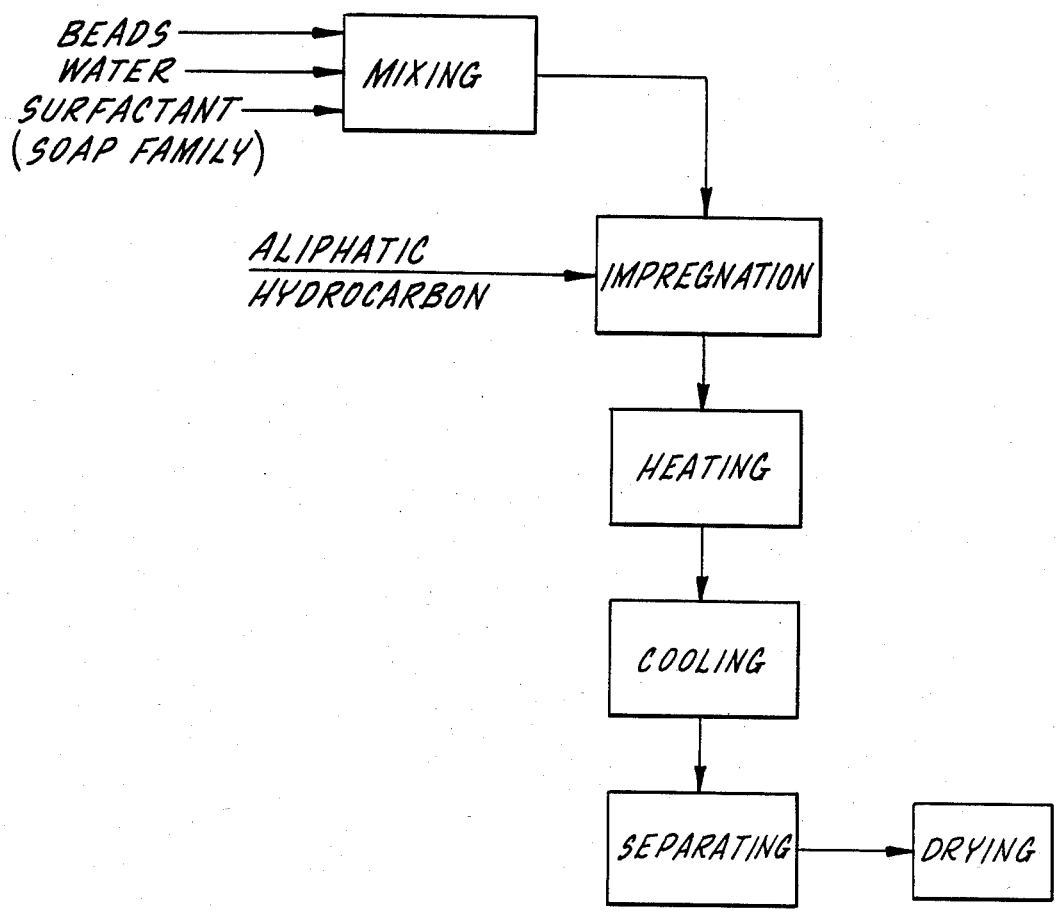

4,560,705

IMPREGNATING POLYSTYRENE BEADS WITH AN EXPANDING AGENT

This application is a continuation of application Ser. No. 603,887, filed Apr. 23, 1984.

SUMMARY OF THE INVENTION

This invention relates to the preparation of expandable or foamable polystyrene. The impregnated beads are suitable for use in molding, where the beads expand into a foamed structure. The resulting products having a variety of uses such as floats, insulation, packaging and drinking cups. A typical process for making expandable beads is disclosed in Wright, U.S. Pat. No. 3,027,335. In the conventional process, the polystyrene beads are combined with an impregnating solution of water and a suspending agent. These components are placed in an agitated vessel. The suspending agent is necessary to keep the beads from agglomerating which, if it were to occur, would prevent proper impregnation of the beads causing a substantial loss of usuable polymer for forming lumps or clusters of usuable material. One conventional suspending agent heretofore used is tricalcium phosphate (TCP). The tricalcium phosphate forms a chalky surface on the beads which effectively prevents agglomeration. Other suspending agents are described in Wei, U.S. Pat. No. 4,226,942.

However, removal of the tricalcium phosphate from the beads after impregnating is rather difficult. Removal of the TCP requires the use of a hydrochloric acid solution. This materially increases the cost of the process because the equipment for utilizing and metering acids is, of course, complex and expensive. Further, the use of TCP requires equipment to effect a neutralization of the acid solution by lime or NaOH addition to re-precipitate the TCP. Final removal of the TCP requires settling basins or other water purification equipment. The cost of chemicals and equipment add to the cost of preparing impregnated polystyrene beads.

A primary object of the present invention is to reduce the cost of preparing expandable polystyrene beads by eliminating the use of tricalcium phosphate as a suspending agent in the impregnating process.

Another object is the elimination of the need to handle acid solutions in the preparation of expandable polystyrene beads.

Another object is an improved impregnating solution for preparing expandable polystyrene beads.

Another object is a method of preparing expandable polystyrene beads which eliminates the need to wash the beads after the impregnating process is complete.

Another object is a method of preparing expandable polystyrene beads which uses a two soap system as the anti-agglomeration agent.

Another object is an anti-agglomeration agent for the above method which uses about one part of linear alkyl benzene sulfonate, sodium salt and 35 parts of alkylaryl polyether alcohol.

Other objects may appear in the following specification, drawing and claims.

BRIEF DESCRIPTION OF THE DRAWING

The FIGURE illustrates a flow diagram of a preferred method of preparing expandable polystyrene beads according to the present invention.

DESCRIPTION OF THE PREFERRED EMBODIMENT

The invention relates to a method of impregnating polystyrene beads which eliminates the conventional step of using tricalcium phosphate or other known suspending agents. This is accomplished in the present invention by using a concentrated surfactant from the soap family as an anti-agglomeration agent. The surfactant prevents the beads from sticking together while in the impregnation bath or solution, thereby permitting them to become impregnated with the expanding agent.

More particularly the surfactant that is used is a combination of two soaps, the first of which is a particular surfactant known to be effective as an anti-agglomeration agent which is alkylaryl polyether alcohol sold by Rohm and Haas Company under the trademark TRITON. It has been found that TRITON type X-100 or X-102 is particularly suitable. The other is a surfactant known as NACCANOL 90° F. which is a sodium dodecylbenzene sulfonate sold by the Stepan Chemical Company. This particular combination is particularly effective and much more so than either alone.

Where this combination of soaps are used, it has been found that something on the order of from 2 to 3 grams of sodium dodecylbenzene sulfonate with some 75 to 100 grams of alkylaryl polyether alcohol is quite effective when used with 200 lbs. of beads. The amounts may vary, but the proportion is what is important. It will be understood, however, that other surfactants of the soap family which are the equivalent of TRITON and NACCANOL could be used as the combination of soap for the surfactant and the invention should not be limited to the particular combination disclosed.

The FIGURE illustrates the details of a specific method of impregnating polystyrene beads. For example, one hundred parts polystyrene beads, one hundred parts water and one part concentrated surfactant, such as alkylaryl polyether alcohol and sodium sulfonate, all measurements by weight, are placed in a stirred autoclave. Then some three to ten parts of an aliphatic hydrocarbon is injected. Pentane has been found to be a suitable aliphatic hydrocarbon which is compatible with both alkylaryl polyether alcohol and dodecylbenzene sulfonate. Some of the TRITON could be introduced in the preliminary mixing tank, if desired, so that the beads do not float. Both soaps would be introduced at the same time and together. The mixture is elevated to a temperature between 50° to 300° F. under pressure and maintained for three hours. The preferred temperature is on the order of 170° F. Next the mixture is cooled to somewhere between 40° and 160° F. The beads are then separated from the solution and go directly to a drying process. Since the surfactant washes off the beads with the water during the separating step, there is no need for a separate washing step as in the prior art. This eliminates the hydochloric acid with its attendant handling difficulties.

Whereas a preferred form of the invention has been shown and described, those skilled in the art will understand that variations could be made in the process specifically described. Therefore, the invention is to be limited only by the following claims.

I claim:

1. A method of impregnating polystyrene beads with an expanding agent to render the beads expandable, comprising the steps of preparing an impregnating solution including water, an expanding agent, and a suspending agent which includes a soap mixture of alkylaryl polyether alcohol and sodium dodecylbenzene sulfonate, introducing a certain amount of polystyrene beads into the solution, proportioning the beads and soap mixture on the basis of about 200 lbs. of beads to about 110–250 grams of alkylaryl polyether alcohol and about 2 grams to 15 grams of sodium dodecylbenzene sulfonate, enclosing the solution and beads in a stirred autoclave under pressure, maintaining the solution and beads under pressure in the autoclave for a selected time period and at a temperature and pressure suitable to cause the expanding agent to penetrate the beads, removing the beads and solution from the autoclave, and separating the beads from the solution.

2. The method of claim 1 wherein the expanding agent is pentane.

3. The method of claim 1 further characterized by and including the steps of using one hundred parts of water, one hundred parts of polystyrene beads and one part of the soap mixture, maintaining the mixture under pressure in the autoclave for about three hours at a temperature between 50° and 300° F., cooling the mixture to somewhere between 40° and 160° F., and thereafter separating the beads from the solution.

4. The method of claim 3 further characterized by and including the step of drying the impregnated beads after separation from the liquid.

5. The method of claim 3 further characterized in that the temperature of the autoclave is at approximately 170° F.

* * * * *